D. L. GRAVES.
Whisky-Mash Rake.

No. 228,190. Patented June 1, 1880.

WITNESSES:
S. W. D. Stone
O. Peebles

INVENTOR.
David L. Graves,
PER. W. K. Stevens,
ATTY.

UNITED STATES PATENT OFFICE.

DAVID L. GRAVES, OF NEAR LOUISVILLE, KENTUCKY.

WHISKY-MASH RAKE.

SPECIFICATION forming part of Letters Patent No. 228,190, dated June 1, 1880.

Application filed February 7, 1880.

*To all whom it may concern:*

Be it known that I, DAVID L. GRAVES, of near Louisville, Jefferson county, State of Kentucky, have invented a Whisky - Mash Rake, of which the following is a specification.

The object of my invention is to mix sour mash for whisky thoroughly and rapidly, to keep it far enough from the center of the mash-tub to be well stirred by the rake, and to prevent it from being slopped out of the tub while mixing, which I accomplish by means of two concentric rakes caused to revolve in opposite directions at the same time in the same mash-tub, one rake carrying a central drum or tub, the other carrying a cover over the mash in the tub.

Figure 1:
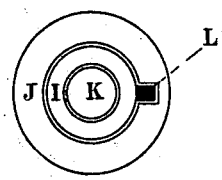
Figure 2:
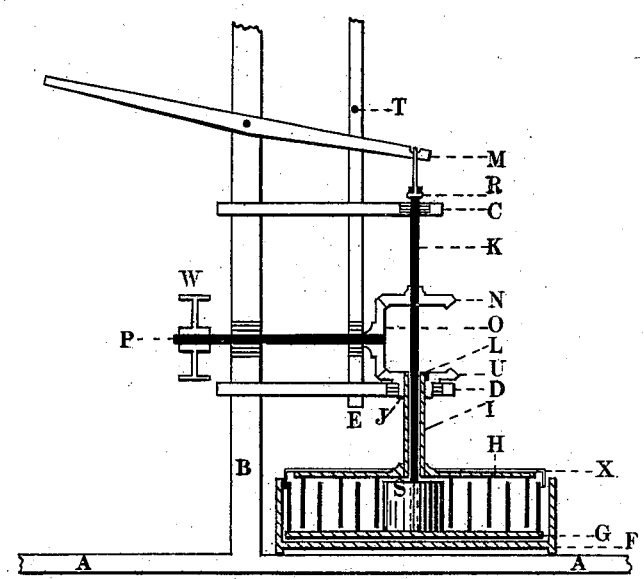

Figure 1 of the accompanying drawings is a horizontal section at D, Fig. 2, through the hub of the beveled gear U. Fig. 2 is an elevation, partly in section, showing my invention.

A represents the floor of the mill; B C D E, the frame-work supporting my rakes G H and their driving - gear. F represents the mash-tub. P is the main shaft, on which are secured the belt-pulley W and gear-wheel O. K is a vertical shaft, to which is secured the lower rake-head, G, and drum S. I is a pipe surrounding the shaft K, and serving as a shaft to the rake H, which is secured to it. This pipe-shaft I is fitted to slide freely vertically through the hub J of the bevel-gear U, Fig. 1, and has a spline, L, upon its side, which drops into a slot in the hub J, by which means circular motion is communicated from the gear-wheel O, through the wheel U and the pipe-shaft I, to its rake H, whose teeth extend vertically downward, so as to pass between the teeth which rise up from the rake-head G, and the revolving of the main shaft P in one direction causes the two rakes to revolve in opposite directions to each other at the same time.

The shaft K has a swivel-connection at its upper end by means of the link R, in which it revolves freely, with the lever M, which is fulcrumed upon the post B. By means of this lever M both the shafts K and I, with their rakes, the drum S, and the lid X, may be raised vertically out of the mash-tub F, so that said tub may be removed at will. Said lever and the rakes hanging by it may be held up by means of the pin T in the post E.

When the rakes are raised the pipe-shaft I slips through and leaves its driving-gear U still running in its bearing in the cross-timber D, but the gear N rises with its shaft K.

By means of the driving-pulley W the shaft P, with the gears O and U, are kept constantly running, and when the lever M is lowered the gear-wheel N drops into mesh with its mate O and the spline L drops into its slot in the hub of the gear U, and both rakes are set in motion.

The drum or tub S is concentric and revolves with the rake G, to which it is attached, and serves to keep the mash far enough from center to be well worked by the rake-teeth.

X is a cover or lid nearly covering the mash-tub, but having its flanged edges project down a little inside the tub, so as to revolve freely with the upper rake, H, to which it is secured, for the purpose of keeping the rakes from slopping the mash out of the tub.

The advantages of my invention are rapidity and ease in thoroughly mixing the mash.

I am informed that there is a mash-rake somewhat similar to mine having two heads; but one of the heads is stationary when in use. Other modes of driving my rakes in two opposite directions at the same time may be used, and other ways of elevating and sustaining the rakes out of the tub; but

What I claim as my invention, and wish to secure by Letters Patent, is—

In combination with a whisky-mash tub, and placed within the same, two rakes on separate shafts, whereby they may be made to revolve simultaneously and in opposite directions, the one rake carrying a lid to cover the tub and the other carrying a central drum, substantially as and for the purpose specified.

DAVID L. GRAVES.

Witnesses:
S. W. D. STONE,
W. X. STEVENS.